United States Patent
Harris et al.

(10) Patent No.: US 8,673,515 B2
(45) Date of Patent: Mar. 18, 2014

(54) DIAGNOSIS AND REMEDIATION OF LOW ANODE HYDROGEN PARTIAL PRESSURE IN A PEM FUEL CELL SYSTEM

(75) Inventors: Daniel I. Harris, Honeoye Falls, NY (US); Matthew A. Lang, Churchville, NY (US); Daniel C. Di Fiore, Scottsburg, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 865 days.

(21) Appl. No.: 12/844,423

(22) Filed: Jul. 27, 2010

(65) Prior Publication Data

US 2012/0028152 A1  Feb. 2, 2012

(51) Int. Cl.
*H01M 8/04*  (2006.01)

(52) U.S. Cl.
USPC ........... 429/444; 429/443; 429/430; 429/431; 429/432; 429/428

(58) Field of Classification Search
CPC ............... H01M 8/04388; H01M 8/04552; H01M 8/04559; H01M 8/04589; H01M 8/04447; H01M 8/04753; H01M 8/04798; H01M 8/04873; H01M 8/0488; H01M 8/0491; H01M 2008/1095; Y02E 60/50
USPC .......... 429/428, 429, 430, 432, 443, 444, 446
IPC ......................................................... H01M 8/04
See application file for complete search history.

(56) References Cited

U.S. PATENT DOCUMENTS

| 2008/1011879 | | 5/2008 | Chapman et al. | |
| 2008/0145715 A1* | | 6/2008 | Lienkamp et al. | 429/13 |

* cited by examiner

*Primary Examiner* — Basia Ridley
*Assistant Examiner* — Heng Chan
(74) *Attorney, Agent, or Firm* — John A. Miller; Miller IP Group, PLC

(57) ABSTRACT

A system and method for preventing anode reactant starvation. The system includes a hydrogen source, an anode bleed valve, and a cell voltage monitor. The system also includes an anode sub-system pressure sensor and a controller configured to control the anode sub-system. The controller determines the average cell voltage and estimates the hydrogen molar fraction and/or nitrogen molar fraction in the anode sub-system. The controller also receives measurement data from the cell voltage monitor and the pressure sensor, and determines whether there is a decrease in the minimum cell voltage in response to changes in the anode pressure. If the controller detects a decrease in the minimum cell voltage in response to changes in the anode pressure, the controller corrects for the decrease by increasing anode pressure and/or by decreasing the molar fraction of nitrogen in the anode sub-system.

14 Claims, 3 Drawing Sheets

DIAGNOSIS AND REMEDIATION OF LOW ANODE HYDROGEN PARTIAL PRESSURE IN A PEM FUEL CELL SYSTEM

BACKGROUND OF THE INVENTION

1. Field of the Invention

This invention relates generally to system and method for determining and correcting for low anode hydrogen partial pressure in an anode sub-system of a fuel cell system and, more particularly, to a system and method for preventing anode starvation by correlating changes in minimum cell voltage to anode pressure and/or nitrogen molar fraction changes in the anode sub-system of a fuel cell system.

2. Discussion of the Related Art

Hydrogen is a very attractive fuel because it is renewable and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell type for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs require adequate fuel supply and humidification for effective operation.

Several fuel cells are typically combined in a fuel cell stack to generate the desired power. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

A fuel cell stack typically includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The MEAs are permeable and thus allow nitrogen in the air from the cathode side of the stack to permeate therethrough and collect in the anode side of the stack, often referred to as nitrogen cross-over. Even though the anode side pressure may be slightly higher than the cathode side pressure, cathode side partial pressures will cause air to permeate through the membrane. Nitrogen in the anode side of the fuel cell stack dilutes the hydrogen such that if the nitrogen concentration increases above a certain percentage, such as 50%, fuel cells in the stack may become starved of hydrogen. If the anode becomes hydrogen starved, the fuel cell stack will fail to produce adequate electrical power and may suffer damage to the electrodes in the fuel cell stack.

It is known in the art to provide a bleed valve at the anode exhaust gas output of the fuel cell stack to remove nitrogen from the anode side of the stack. It is also known in the art to estimate the molar fraction of nitrogen in the anode side using a model to determine when to perform the bleed of the anode side or anode sub-system. However, the model estimation may contain errors, particularly during operation just after start-up. Additionally, component failures and degradation of the components of the fuel cell system, such as the fuel cell membrane, may also cause errors in the model estimation. If the anode nitrogen molar fraction estimation is significantly higher than the actual nitrogen molar fraction, the fuel cell system will vent more anode gas than is necessary, i.e., will waste fuel. If the anode nitrogen molar fraction estimation is significantly lower than the actual nitrogen molar fraction, the system will not vent enough anode gas and may starve the fuel cells of reactants, which may damage the electrodes in the fuel cell stack. Therefore, there is a need in the art to detect and correct for anode reactant starvation before the starvation causes significant damage to the fuel cell electrodes.

SUMMARY OF THE INVENTION

In accordance with the teachings of the present invention, a system and method are disclosed for preventing a fuel cell stack in a fuel cell system from operating with an insufficient amount of anode reactant. The system includes a hydrogen source for providing hydrogen to the stack, an anode bleed valve, and a cell voltage monitor. The system also includes an anode sub-system pressure sensor and a controller configured to control the anode sub-system. The controller determines the average cell voltage of the cells in the stack and estimates the hydrogen molar fraction and/or nitrogen molar fraction in the anode sub-system. The controller also receives measurement data from the cell voltage monitor and the pressure sensor, and determines whether there is a decrease in the minimum cell voltage in response to changes in the anode pressure. If the controller detects a decrease in the minimum cell voltage in response to changes in the anode pressure, the controller corrects for the decrease by increasing anode pressure and/or by decreasing the molar fraction of nitrogen in the anode sub-system.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for preventing anode starvation by correlating minimum cell voltage to changes in anode pressure and/or nitrogen molar fraction changes in the anode sub-system of a fuel cell system is merely exemplary in nature, and is in no way intended to limit the invention or its applications or uses.

Figure 1:
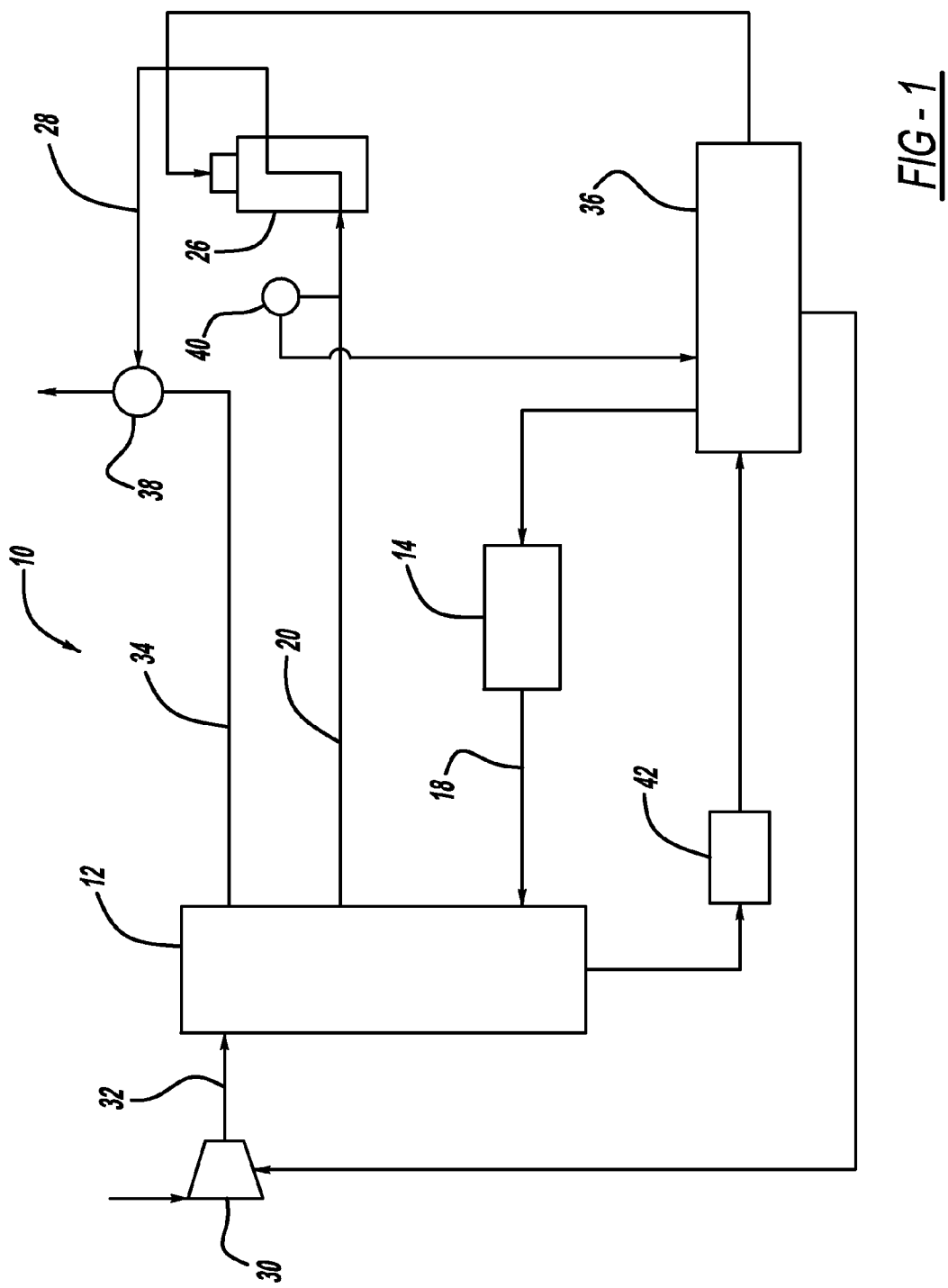
FIG. 1 is a simplified block diagram of a fuel cell system.

FIG. 1 is a simplified block diagram of a fuel cell system 10 including a fuel cell stack 12. The fuel cell system 10 is intended to generally represent any type of fuel cell system that requires an anode exhaust gas bleed to remove nitrogen from the anode side of the stack 12. Examples of such fuel cell systems include fuel cell systems that recirculate the anode exhaust gas back to the anode inlet and fuel cell systems that employ a split stack design with anode flow-shifting, both of which are referred to herein as an "anode sub-system". Hydrogen gas from a hydrogen source 14 is provided to the anode side of the fuel cell stack 12 on line 18. An anode exhaust gas is output from the fuel cell stack 12 on line 20 and is sent to a bleed valve 26. When the bleed valve 26 is open, the bled anode exhaust gas flows through a bleed line 28. A pressure sensor 40 is also provided in the line 20 to measure the pressure of the anode sub-system of the fuel cell system 10. In an alternate embodiment, the pressure sensor 40 may be positioned in the line 18, as is known to those having skill in the art.

Air from a compressor 30 is provided to the cathode side of the fuel cell stack 12 on line 32. A cathode exhaust gas is output from the fuel cell stack 12 on a cathode exhaust gas line 34. A mixing device 38 is provided in the line 34 for mixing the cathode exhaust gas and the bled anode exhaust gas on the line 28.

The system 10 also includes a cell voltage monitor 42 that monitors the average stack voltage, current density, and minimum cell voltage of the fuel cells in the stack 12 in a manner that is known to those skilled in the art.

A controller 36 monitors the pressure of the anode sub-system of the fuel cell system 10, as measured by the pressure sensor 40, controls the speed of the compressor 30, controls the injection of hydrogen from the hydrogen source 14 to the anode side of the stack 12, and controls the position of the anode bleed valve 26, as is discussed in more detail below. The controller 36 also calculates average cell voltage from the cell voltage monitor 42, determines the minimum cell voltage of the fuel cells in the stack 12 and calculates the current density of the stack 12.

As discussed above, nitrogen cross-over from the cathode side of the fuel cell stack 12 dilutes the hydrogen in the anode side of the stack, thereby affecting fuel cell stack performance. Therefore, it is necessary to periodically bleed the anode exhaust gas from the anode sub-system of the fuel cell system 10 to reduce the amount of nitrogen in the anode sub-system, i.e., the anode side of the fuel cell stack 12. Also discussed above, a typical fuel cell system employs a nitrogen estimation model to determine when to bleed nitrogen from the anode side of the stack 12.

Figure 2:
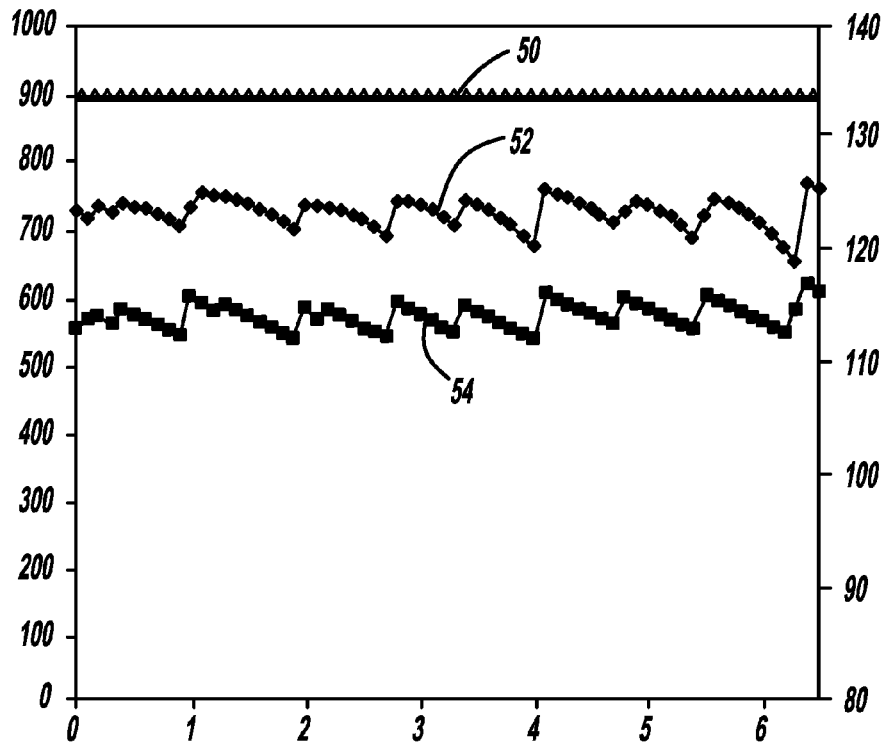
FIG. 2 is a graph with time on the x-axis, cell voltage on the left y-axis and anode absolute pressure on the right y-axis, illustrating how changes in pressure effects minimum cell voltage.

Due to rapid anode kinetics, as anode starvation is occurring, small changes in the anode pressure may greatly affect the lowest or minimum cell voltage measured in the fuel cell stack 12. FIG. 2 is a graph with time in seconds on the x-axis and cell voltage in mV on the left y-axis and anode absolute pressure in kPaA on the right y-axis. Line 50 is the average cell voltage of the fuel cells in the fuel cell stack 12, line 52 is the measured minimum cell voltage, and line 54 is the oscillation in anode pressure during operation of the fuel cell system 10. FIG. 2 illustrates that the average cell voltage is not affected by the changes in anode pressure because anode starvation is local to a small fraction of cells in the stack 12. However, the minimum cell voltage correlates closely to the pressure pulsations or pressure changes in the anode sub-system of the system 10, indicating that pressure changes may be utilized to detect and prevent anode starvation events.

Figure 3:
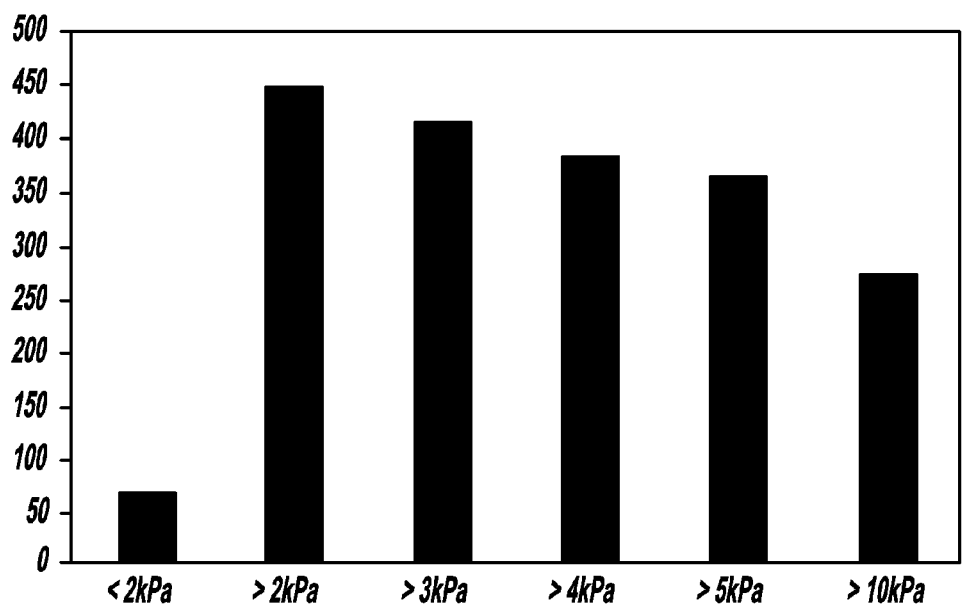
FIG. 3 is a graph with change in pressure on the x-axis and number of events on the y-axis, illustrating the frequency of pressure changes that correlate to minimum cell voltage events.

FIG. 3 is a graph with change in pressure in kPa on the x-axis and number of events on the y-axis. FIG. 3 illustrates the frequency of pressure changes in the anode sub-system in the 0.5 seconds prior to the minimum cell voltage falling 200 mV below the average cell voltage. In one analysis, 515 data samples in 110 data files were evaluated when the minimum cell voltage fell more than 200 mV below average. The results, as shown in FIG. 3, illustrate that approximately 80% of the minimum cell voltage events corresponded to a greater than 3 kPa drop in anode pressure in the 500 milliseconds prior to the minimum cell voltage event. Thus, the data illustrates that correlating minimum cell voltage and changes in anode pressure may be utilized to anticipate anode starvation, thereby providing a way to prevent anode starvation from damaging the components of the fuel cell system 10.

Figure 4:
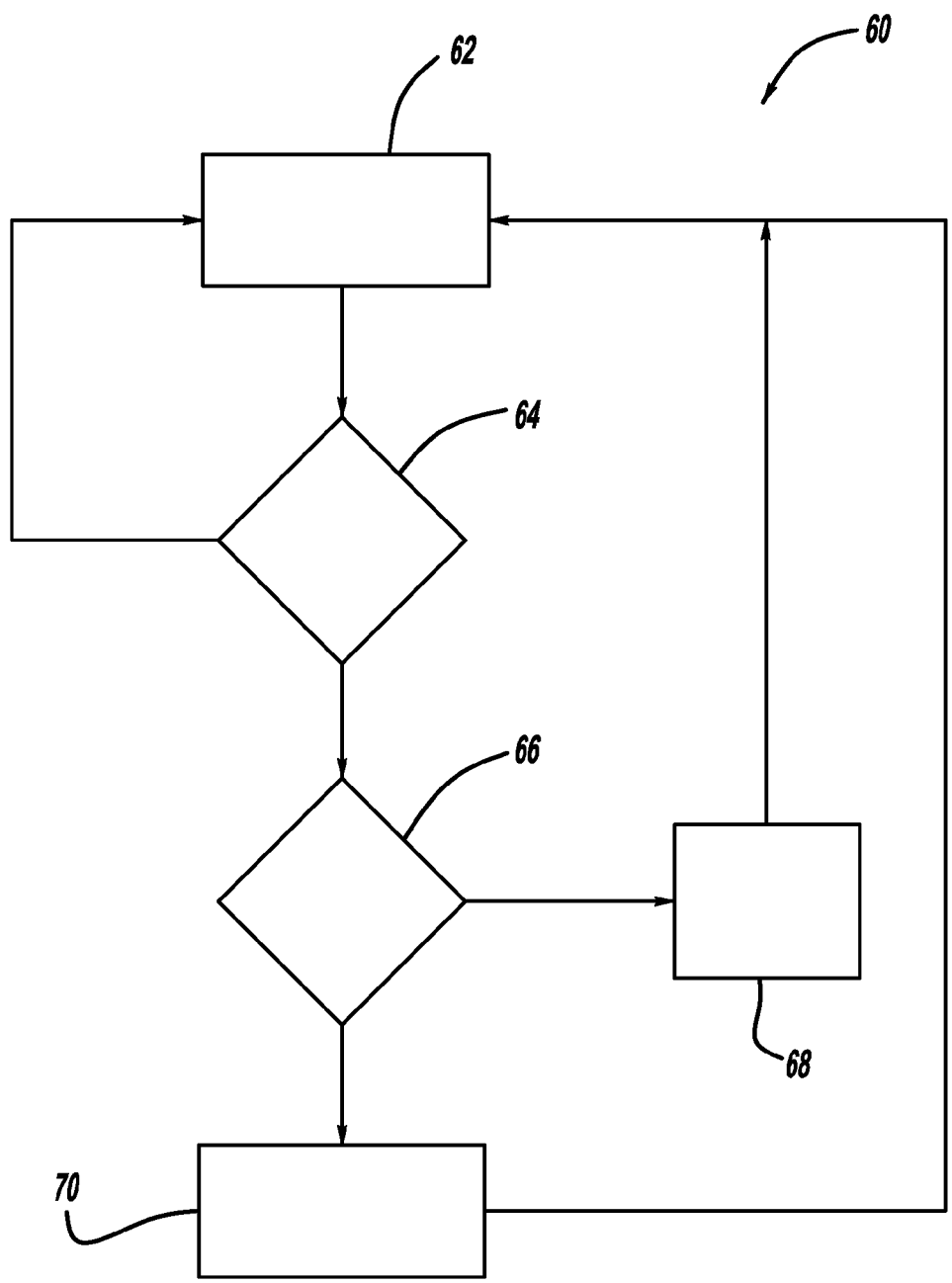
FIG. 4 is a flow chart diagram of an algorithm for detecting anode starvation.

FIG. 4 is a flow diagram 60 of an algorithm operating in the controller 36 for detecting anode starvation. At box 62, the algorithm determines minimum cell voltage, average cell voltage, anode pressure and stack current, and also determines the estimated molar fraction of nitrogen and/or hydrogen in the anode sub-system. Next, the algorithm determines whether there is a decrease in minimum cell voltage relative to changes in hydrogen partial pressure, i.e., a minimum cell voltage that is approximately 200 mV lower than the average cell voltage for a given current density in response to changes in the pressure of the anode sub-system or changes in hydrogen concentration in the anode side of the stack 12, at decision diamond 64. If there is not a decrease in minimum cell voltage, the algorithm continues to monitor minimum cell voltage, anode pressure, stack current and current density, and also continues to determine the estimated molar fraction of nitrogen and/or hydrogen at the box 62.

If there is a decrease in minimum cell voltage correlated to changes in hydrogen partial pressure at the decision diamond 64, the algorithm determines if anode starvation has occurred frequently, for example, four or more events during 30 minutes of operation of fuel cell system 10, at decision diamond 66. If repeat anode starvation can be detected or assumed, permanent change to the control operating conditions is taken as described in more detail below. If not, the algorithm will temporarily change the operating conditions of the fuel cell system 10 to prevent the anode starvation from damaging components of the system 10 at box 68. For example, the algorithm may cause the controller 36 to boost the pressure in the anode sub-system of the fuel cell system 10. More specifically, the controller 36 may boost the pressure in the anode sub-system by approximately 15 kPa by providing additional hydrogen to the anode sub-system. By increasing the pressure in the anode sub-system, the partial pressure of hydrogen in the stack 12 is also increased. Thus, the stack 12 should be more tolerant to higher than predicted nitrogen molar fractions. If the minimum cell voltage increases by more than an expected value for the present current density after receiving the boost in pressure, anode starvation can be assumed.

The increase in pressure for each boost may depend on the measured minimum cell voltage in relation to average cell voltage and stack current density, and may also depend on stack characteristics, such as stack design and the number of fuel cells in the stack 12. However, the increase in pressure may be limited. For example, the increase in pressure may be limited to a 10-20% increase from nominal levels to ensure hydrogen emissions do not exceed a predetermined threshold level.

Alternatively, if there is a decrease in the minimum cell voltage at the decision diamond 64, instead of boosting the pressure, the algorithm may cause the controller 36 to bleed the anode sub-system until a higher hydrogen concentration in the anode sub-system is reached. For example, the anode nitrogen molar fraction model may be reset to a value of 100% nitrogen in the anode sub-system. In other words, the most conservative estimation of anode nitrogen molar fraction is used for the model initialization. If for example, the set-point for the nitrogen molar fraction is 40%, the controller 36 will open the bleed valve 26 for a long enough period of time to bleed 100% nitrogen and fill the anode until the anode concentration is modeled to 40% nitrogen molar fraction. In all practical cases, after the nitrogen molar fraction model is reset, the true nitrogen molar fraction will be much less than the modeled value of nitrogen for a significant period of time. After the anode bleed as discussed above, if the minimum cell voltage increases by more than an expected value for the present current density and hydrogen concentration, anode starvation can be assumed.

Each time the minimum cell voltage of the stack 12 drops below some predetermined average cell voltage, the algorithm will take action to prevent anode starvation from damaging components of the fuel cell system 10, such as the electrodes. The action taken, as discussed above, may be a boost in pressure, a change in the nitrogen molar fraction model, or a combination thereof.

Once the algorithm has caused the controller 36 to temporarily change the operating conditions of the fuel cell system 10 at the box 68, the algorithm returns to the box 62 and the algorithm continues to monitor minimum cell voltage, anode pressure, stack voltage and current density, and also determines the estimated molar fraction of nitrogen and/or hydrogen in the anode sub-system.

If the algorithm determines that anode starvation has been detected frequently at the decision diamond 66, for example, four or more anode starvation events during 30 minutes of operation of the fuel cell system 10, then the algorithm may change anode operational set-points to address more chronic problems with anode nitrogen control, i.e., recurring anode starvation, at box 70. By changing the operational set-points of the anode sub-system, future failures due to anode starvation and/or excessive nitrogen in the anode sub-system may be prevented. For example, the nitrogen molar fraction set-points for the anode bleed control may be decreased by the algorithm. Decreasing the nitrogen molar fraction set-points will increase the hydrogen partial pressure in the anode by bleeding gas out of the anode volume in the anode sub-system more frequently.

Alternatively, or in addition to changing the nitrogen molar fraction set-points, the algorithm may increase the anode pressure control set-points. Increasing the anode pressure set-points will permanently increase the partial pressure of hydrogen in the anode if the nitrogen molar fraction remains constant. As discussed above, higher hydrogen partial pressures should reduce the impact of higher than predicted nitrogen molar fractions in the anode. However, the changes in operational set-points, as discussed above, may be limited such that the increase in hydrogen utilized is limited. For example, the amount of increase in hydrogen consumption may be limited to 10-20% to limit the amount of hydrogen emitted from the fuel cell system 10. Furthermore, the adaptive changes made by the algorithm in the operational set-points of the fuel cell system 10, discussed above, may be reset by calibrating the fuel cell system 10. For example, the operational set-points may be reset during a servicing event of the system 10 or a vehicle in which the system 10 has been placed.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for preventing a fuel cell stack in a fuel cell system from operating with an insufficient amount of anode reactant, said method comprising:
   determining a minimum cell voltage of fuel cells in the fuel cell stack, an average cell voltage of the fuel cells in the stack and a current density of the fuel cell stack;
   determining an anode pressure of an anode sub-system in the fuel cell system;
   estimating a hydrogen molar fraction and/or a nitrogen molar fraction in the anode sub-system;
   determining that there is a decrease in the minimum cell voltage, relative to the average cell voltage and current density, in response to changes in the anode pressure in the anode sub-system; and
   correcting for the decrease in the minimum cell voltage in response to changes in the anode pressure by increasing the anode pressure and/or by decreasing the molar fraction of nitrogen in the anode sub-system.

2. The method according to claim 1 wherein determining that there is a decrease in the minimum cell voltage includes determining that there is a decrease in the minimum cell voltage that is approximately 200 mV lower than average cell voltage for the current density of the stack.

3. The method according to claim 2 wherein determining that there is a decrease in the minimum cell voltage includes determining that there is a decrease in the minimum cell voltage in response to a change in anode pressure of 2 kPa or more.

4. The method according to claim 1 wherein correcting for the decrease in the minimum cell voltage in response to changes in the anode pressure by boosting the anode pressure includes increasing the anode pressure by 15 kPa.

5. The method according to claim 1 wherein correcting for the decrease in the minimum cell voltage in response to changes in the anode pressure includes decreasing the nitrogen molar fraction in the anode sub-system by bleeding the anode sub-system.

6. The method according to claim 1 further comprising determining a number of occurrences of correcting for the decrease in the minimum cell voltage in response to changes in the anode pressure during a predetermined operating time of the fuel cell system.

7. The method according to claim 6 wherein determining if the number of occurrences of correcting for the decrease in the minimum cell voltage in response to changes in the anode pressure during the predetermined operating time achieves a predetermined threshold.

8. The method according to claim 7 further comprising changing anode operational set-points of the fuel cell system if the number of occurrences of correcting for the decrease in the minimum cell voltage in response to changes in the anode pressure achieves the predetermined threshold.

9. The method according to claim 8 wherein changing the anode operational set-points of the fuel cell system includes increasing the anode sub-system pressure set-point and/or decreasing the nitrogen molar fraction set point in the anode sub-system.

10. A method for preventing a fuel cell stack in a fuel cell system from operating with an insufficient amount of an anode reactant, said method comprising:
   determining a minimum cell voltage of fuel cells in the fuel cell stack, an average cell voltage of the fuel cells in the stack, and a stack current density;
   determining an anode pressure of an anode sub-system in the fuel cell system;
   estimating a hydrogen molar fraction and/or nitrogen molar fraction in the anode sub-system;
   determining that there is a decrease in the minimum cell voltage, relative to the average cell voltage and current density, in response to changes in the anode pressure or hydrogen concentration in the anode sub-system;
   correcting for the decrease in the minimum cell voltage in response to changes in the anode pressure or hydrogen concentration by increasing the anode pressure and/or decreasing the nitrogen molar fraction in the anode sub-system;
   determining if the number of occurrences of the decrease in the minimum cell voltage in response to changes in the anode pressure or hydrogen concentration for a predetermined operating time of the fuel cell system achieve a predetermined threshold; and
   changing anode operational set-points of the fuel cell system if the number of occurrences of the decrease in the minimum cell voltage in response to changes in the anode pressure or hydrogen concentration achieves the predetermined threshold by increasing the anode pressure set-point and/or by decreasing the nitrogen molar fraction set-point in the anode sub-system.

11. The method according to claim 10 wherein determining that there is a decrease in the minimum cell voltage includes determining that there is a decrease in the minimum cell voltage that is approximately 200 mV lower than average cell voltage for the current density of the stack.

12. The method according to claim 10 wherein determining that there is a decrease in the minimum cell voltage includes determining that there is a decrease in the minimum cell voltage in response to a change in anode pressure of 2 kPa or more.

13. The method according to claim 10 wherein correcting for the decrease in the minimum cell voltage in response to changes in the anode pressure includes increasing the anode pressure by 15 kPa.

14. The method according to claim 10 wherein correcting for the decrease in the minimum cell voltage in response to changes in the anode pressure or hydrogen concentration includes decreasing the nitrogen molar fraction in the anode sub-system by bleeding the anode sub-system.

* * * * *